United States Patent [19]
Woodard

[11] 3,942,830
[45] Mar. 9, 1976

[54] ACCORDION COVER FOR DUMP TRUCKS

[76] Inventor: Boyd Ray Woodard, 6995 NW. 32nd Ave., Miami, Fla. 33147

[22] Filed: Feb. 11, 1974

[21] Appl. No.: 441,459

[52] U.S. Cl............................ 296/105; 296/100
[51] Int. Cl.² .................................. B60P 7/02
[58] Field of Search............................ 296/105, 100

[56] References Cited
UNITED STATES PATENTS

| | | | |
|---|---|---|---|
| 1,263,759 | 4/1918 | Hanaway | 296/105 |
| 1,376,250 | 4/1921 | Camp | 296/105 |
| 2,469,958 | 5/1949 | Fowler | 296/105 |
| 3,168,345 | 2/1965 | Roberts et al. | 296/100 |
| 3,231,305 | 1/1966 | Beckman | 296/100 |
| 3,326,598 | 6/1967 | Kunsch | 296/105 |
| 3,416,835 | 12/1968 | Ohle | 296/100 |
| 3,688,787 | 9/1972 | Feather | 296/105 |

Primary Examiner—Robert J. Spar
Assistant Examiner—Donald W. Underwood

[57] ABSTRACT

An accordion type of cover for the load-carrying body of a dump truck having a flexible cover fixed relative to a plurality of support frames, movable by an appropriate drive means from a stacked condition forwardly of the load-carrying body to a spread apart condition over said load-carrying body; the flexible cover, therefore, being selectively disposed in a folded condition forwardly of said body or in a covering relation thereto.

5 Claims, 10 Drawing Figures

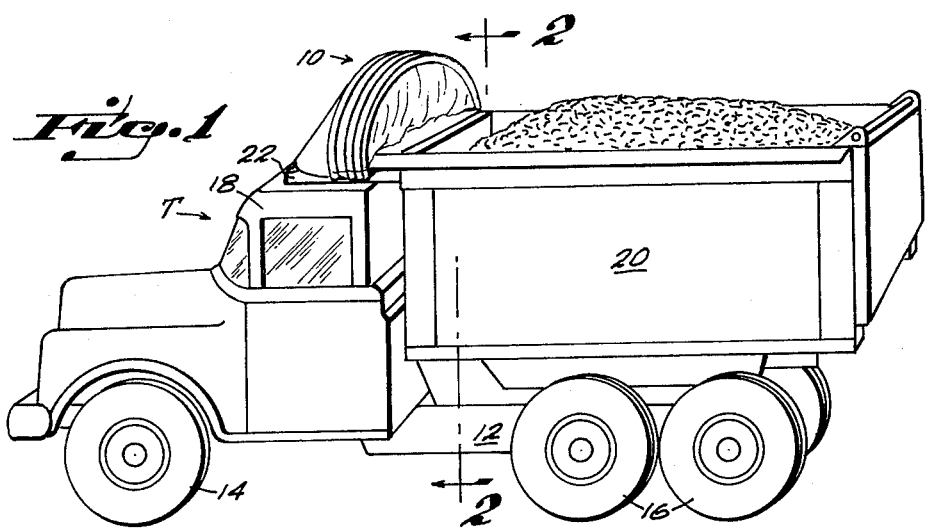
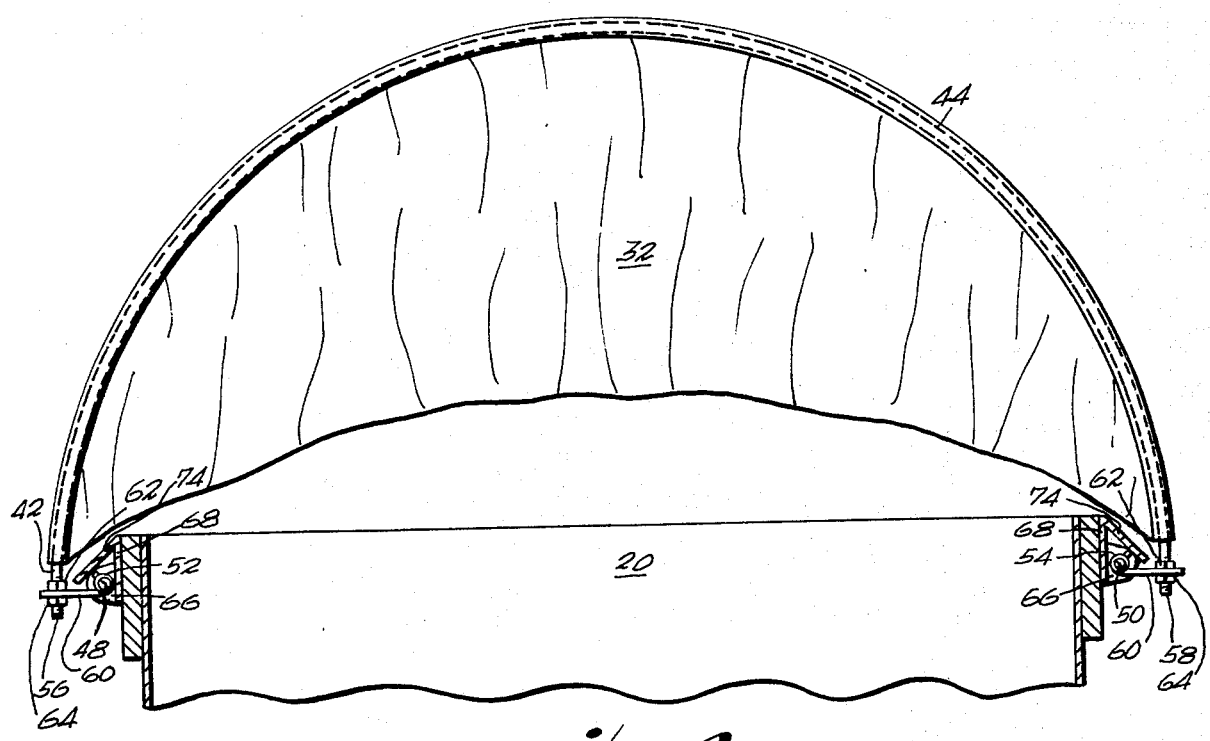
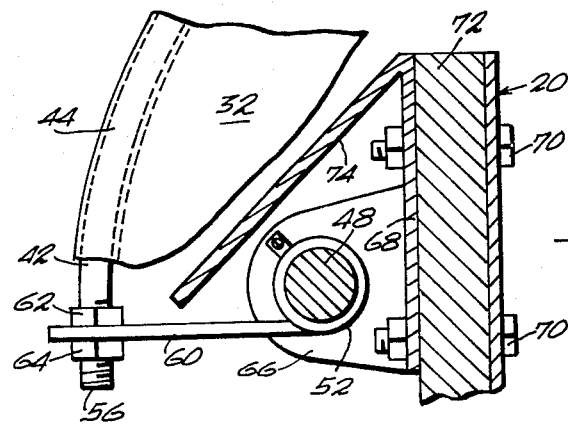

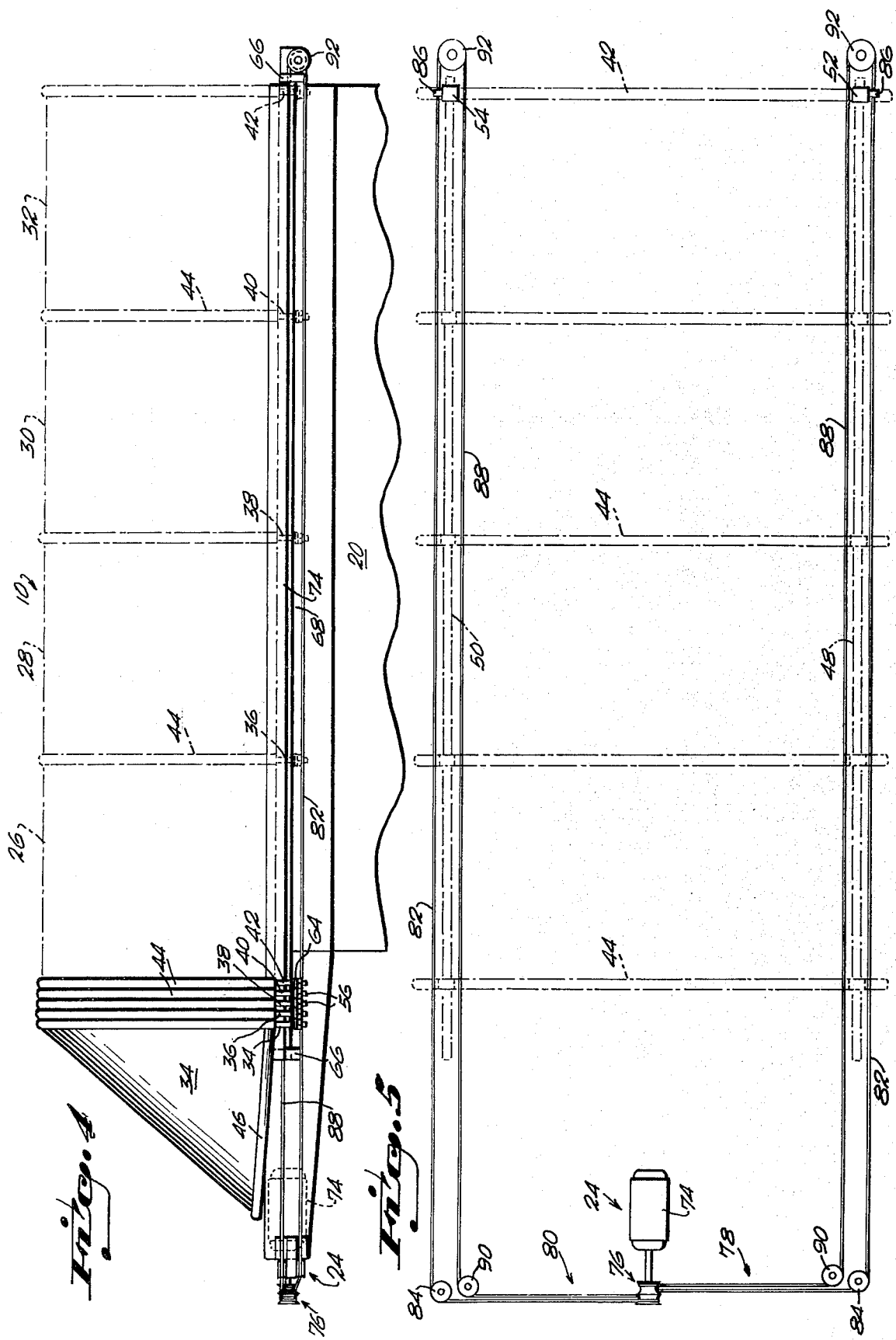

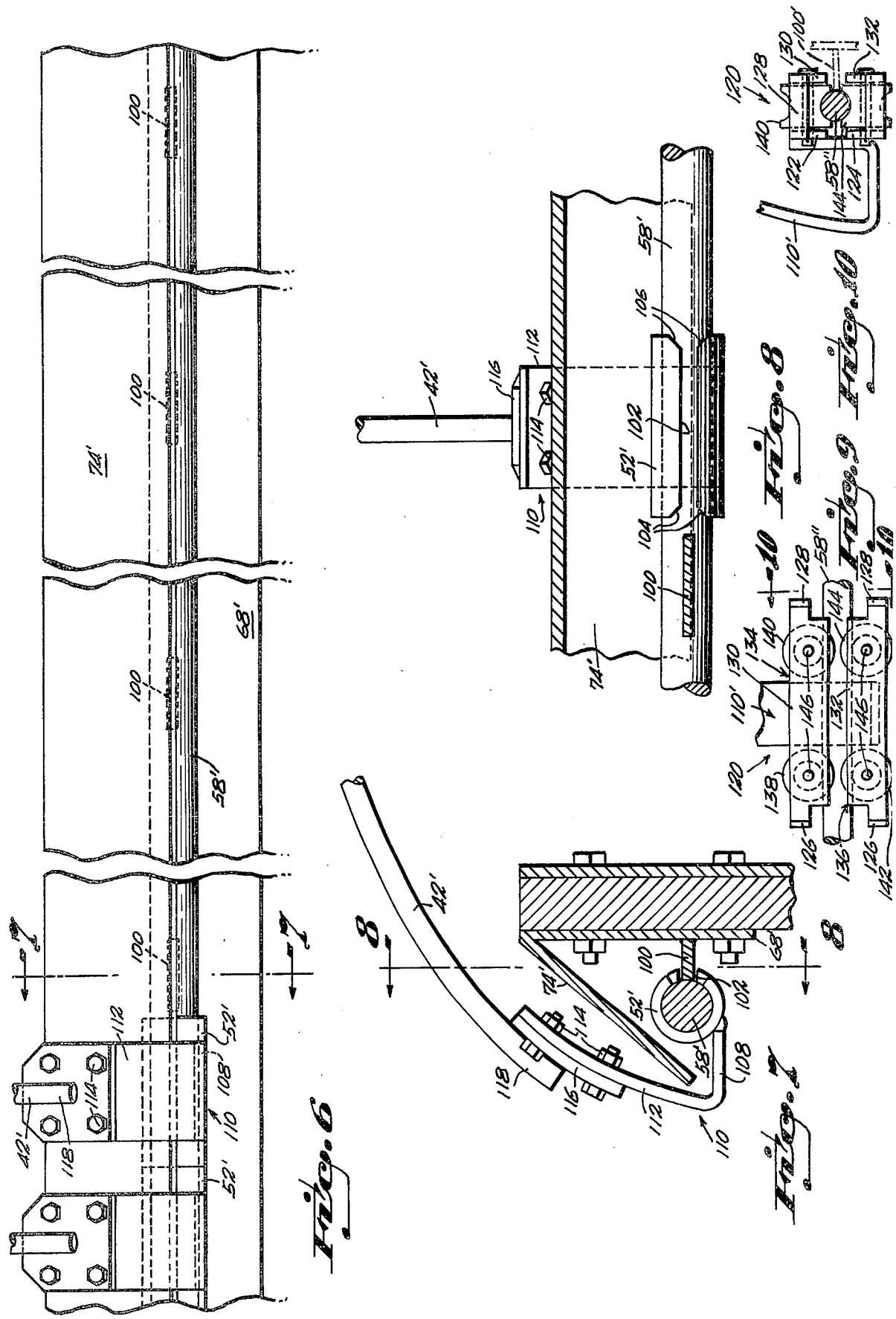

3,942,830

ACCORDION COVER FOR DUMP TRUCKS

STATE OF THE PRIOR ART

Various structures have been devised to cover the load-carrying body of a dump truck such as those disclosed in U.S. Pat. No. 3,549,197 to Louis F. Sibley, and 3,549,198 to Ignazio Capello. Both of said patents disclose forms of dump truck covers comprised generally of flexible covers such as a tarpaulin or canvas which is normally wound on a shaft, drum, reel or the like. A swingable bail or yoke is employed to extend the flexible cover to a covering relation with the open top of the load-carrying body to prevent fine, loose materials such as dirt, sand, gravel, etc., from blowing from the truck body, particularly when the truck attains relatively high speeds.

Means are provided to rewind the flexible cover on the shaft, drum or reel when the bail or yoke is actuated to uncover the open truck top.

BACKGROUND OF THE PRESENT INVENTION

The present invention is directed to an accordion type of flexible cover for the load-carrying body of a truck, which is normally carried in a retracted, folded disposition relative to the front portion of said load-carrying body. Actuation of a motor driven cable means, connecting with the rearmost cover support frame of a plurality thereof, extends the flexible cover to a covering relationship with the open top of the load-carrying body.

While the accordion cover device of the present invention is adaptable to a variety of different types of load-carrying truck bodies, one particular application of the devide is directed to dump trucks which are frequently employed to haul relatively fine, loose materials such as dirt, sand, gravel or the like which readily blow from the trucks during operation thereof. Cargoes of this nature are generally wet or damp to an extent that, in addition to pelting following automobiles and motorcycles, a gooey residue is deposited on the bodies thereof as well as the windshields, creating a driving hazard.

FIELD OF THE INVENTION

The present invention pertains to an accordion type of flexible cover for the load-carrying body of a dump truck. The cover is fixed to a plurality of frame members, movable along a pair of opposed side, slide bars from a first position wherein the flexible cover is disposed in a stacked condition forwardly of the load-carrying body to an extended position wherein the flexible cover is disposed in a covering relation to said load-carrying body to protect the contents of same from the forces created by the combination of the wind and the movement of the vehicle.

BRIEF DESCRIPTION OF THE DRAWINGS

FIG. 1 is a perspective view of a dump truck provided with an accordion type of flexible cover in accordance with the present invention;

FIG. 2 is a cross sectional view taken along the line 2—2 of FIG. 1;

FIG. 3 is an enlarged fragmentary view of a portion of FIG. 2;

FIG. 4 is a side elevational view of the load-carrying body of the dump truck;

FIG. 5 is a schematic illustration of the accordion type of flexible cover relative to the motor actuated cable means utilized to selectively move said cover to retracted or extended positions;

FIG. 6 is an enlarged fragmentary side elevational view of the load-carrying body illustrating a modification thereof;

FIG. 7 is a cross sectional view taken along the line 7—7 of FIG. 6;

FIG. 8 is a longitudinal view taken along the line 8—8 of FIG. 7;

FIG. 9 is a side elevational view of a modified form of journal means for the accordion cover frame means; and FIG. 10 is a cross sectional view taken along the line 10—10 of FIG. 9.

DETAILED DESCRIPTION OF THE DRAWINGS

With reference to the drawings in which like reference characters designate like or corresponding parts throughout the various views and with particular reference to FIG. 1, the accordion cover for the load-carrying body of a dump truck T is designated generally at 10. The truck T includes, generally, a frame or chassis 12, front and rear wheels 14 and 16, a driver's cab 18 and a dump type load-carrying body 20.

Vehicles of this type generally provide a forwardly extending protective member 22 from the top front edge of the load-carrying body 20, which projects over the top of the driver's cab 18. This member 22 may be utilized to mount the drive means, indicated generally at 24 in FIGS. 4 and 5.

As best illustrated in FIGS. 4 and 5, the accordion protective cover 10 is comprised generally of four folding sections 26, 28, 30 and 32 and a front portion 34. The folding sections 26 through 32 are retractable from the extended disposition illustrated in FIG. 4 in broken lines.

The folding sections are defined and supported by five frame members 34, 36, 38, 40 and 42 which laterally bridge the open top of the load-carrying body 20. The arched configuration of said frame members is by way of illustration only. In practice, they may assume any form, appropriate to a particular installation. The flexible cover 10 is seamed in a conventional manner to provide tubular receptacles 44 for the frame members 34 through 42.

Forwardly of the front member 34, the flexible cover 10 is formed into the downwardly and forwardly inclined windbreaker, front portion 34 by means of an appropriately formed generally horizontally disposed frame member in a seamed, tubular receptacle 46 which lies in close proximity to the top surface of the cab protector member 22.

Fixed relative to the outside of the opposed top edge portions of the side walls of the load-carrying body 20 are a pair of slide bars 48 and 50 which are slidably engaged by a pair of journal blocks 52 and 54, fixed relative to the opposed screw-threaded ends 56 and 58 of each frame member 34 through 42. Each journal block 52 and 54 is in the form of a collar or sleeve which includes a laterally, outwardly extending lug 60, fixed to one screw-threaded end portion 56 or 58 between a pair of locks nuts 62 and 64.

As best illustrated in FIGS. 2 and 3, each slide bar 48 and 50 is rigidly fixed between end mounts 66 extending outwardly from each end of an elongated plate 68 bolted as at 70 to each outer top edge portion 72 of the body 20. An outwardly, downwardly inclined cover 74 from the top edge of each plate 68 protects the respective slide bars 48 and 50 during the loading and unloading operations of the load-carrying body.

With reference to FIGs. 4 and 5, the drive means 24 is comprised of a motor means 74, which may be fixed to the protective member 22, in driving connection with a double pulley means 76. Two cables 78 and 80, engaged about the pulley means 76, extend outwardly therefrom in generally opposed directions. Each cable includes a first run 82, directed rearwardly by a first pulley 84 to a point of attachment 86 to the forward side of a projection 86 from a slide journal 52 or 54 on the rear frame member 42, and a second run 88 similarly directed by a second pulley 90 to a third pulley 92 mounted at the rear end of the load-carrying body 20, said second run thereby being redirected forwardly to a point of attachment to the rear side of the projection 86.

The motor means is of the reversible type to permit selective operation thereof to move the four frame members 36, 38, 40 and 42 to either the stacked condition, illustrated in full lines or the extended condition illustrated in dot-dash lines, the front frame member 34 remains relatively stationary.

In operation, the motor means is activated in a first direction to drive the first run 82 of both cables 78 and 80 to move the four frame members 36, 38, 40 and 42 into the stacked relation with the front frame member 34, forwardly of the load-carrying body 20. When the motor means is activated in a second direction, the second run 88 of both cables 78 and 80 is driven to move the four frame member 36, 38, 40 and 42 to the extended disposition, whereby the flexible cover is disposed in a covering relation to the open top of the load-carrying body 20.

With reference to FIGS. 6, 7 and 8, a modification of the present invention is illustrated which is applicable to any size of load-carrying truck body but which is particularly applicable to long load-carrying bodies.

The slide bars 48 and 50 as illustrated in FIGS. 2, 3 and 4 are fixed relative to front and back end mounts 66 extending outwardly from the side plates 68. In long installations, there is sometimes a tendency of the unsupported central portions of the slide bars 48 and 50 to sag slightly causing uneven amounts of friction between the respective slide bars 48 and 50, and journal blocks 52 and 54 resulting in cocking of one or more of the frame members 34 through 42.

To obviate this possibility, particularly for long installations, as illustrated in FIG. 6, each slide bar such as 58' is rigidly fixed along its length to the side plate 68' by a plurality of spaced apart bracket plates 100, fixed as by welding between the slide bar 58' and the side plate 68'. As illustrated in FIGS. 7 and 8, each sliding journal block such as 52' is appropriately, longitudinally slotted at 102 to permit it to bypass the respective bracket plates 100 as it is moved between the front and rear portions of the slide bars such as 58', in either direction, during operation of the device as previously described. With further reference to FIG. 8, the respective ends of the slot 102 are preferably chamfered as at 104 and 106.

Each of the journal blocks such as 52' may be fixed relative to one end of a frame member 34 through 42 in the manner previously described relative to FIGS. 2 and 3 or in the modified version disclosed in FIGS. 7 and 8.

For example, the journal block 52' is welded to the end of the bottom leg 108 of a generally L-shaped bracket 110. The upstanding leg 112 is preferably curved upwardly and inwardly, and is bolted at 114, adjacent it supper end, to a foot plate 116, welded to one end portion 118 of a frame member such as 42' which receives one of the tubular cover receptacles such as 44 in FIG. 2.

Referring to FIGS. 9 and 10, a modified form of journal means for the respective end portions such as 118 (FIG. 7) of the frame members 34 through 42 is illustrated which comprises a trolley means generally indicated at 120. In this form of the invention, the bracket 110' is fixed as by welding to upper and lower inside plates 122 and 124. The inside plates 122 and 124 are fixed by front and back transverse connector members 126 and 128 to upper and lower outside plates 130 and 132, defining rectangular frames 134 and 136 for front and back upper rollers 138 and 140 and front and back lower rollers 142 and 144. The respective pairs of rollers are journaled on stub shafts 146, extending between the upper and lower side plates 122, 130 and 124, 132 in engagement with one of the slide bars such as 58''.

As best illustrated in FIG. 10, the contact surface of each roller is configured to mate with substantially less than 180° of the cross sectional surface of the slide bar 58'' to provide clearance therebetween for the bracket plates 100'. This roller type of journal means greatly reduces friction and virtually eliminates any possibilities of binding between the journal means and slide bars.

What is claimed is:

1. An accordion cover for the open top, load-carrying body of a truck comprising,
   A. a flexible cover, adapted to be moved from a normally open, stacked disposition relative to the open top to an extended, closed disposition relative thereto;
   B. a plurality of frame members spanning the open top in a fixed, spaced apart relation along the length of said flexible cover, each of said frame members including a pair of end portions extending downwardly and outwardly of the respective top, side edges of the load-carrying body;
   C. means to movably connect each of said pair of end portions relative to the length of said load-carrying body;
   D. reversible motor drive means;
   E. cable means connecting between said reversible motor drive means and the rearmost of said frame members whereby said flexible cover is selectively movable between said open and closed positions;
   F. said means to connect comprising guide means fixed relative to the outside of opposed side walls of the load-carrying body and including brackets connecting said guide means and said side walls and a collar having a longitudinal slot along its length comprising means to bypass said brackets;
   G. each of said collars having affixed thereto, as by welding, a radially outwardly extending leg of a generally L-shaped bracket, the upstanding leg of which is curved upwardly and inwardly for bolted attachment to a foot plate fixed to one end portion of one of said frame members.

2. The accordion cover as defined in claim 1 wherein said flexible cover includes a generally transverse front closure portion to deflect the wind forces around and over said flexible cover.

3. The accordion cover as defined in claim 2 wherein said front closure cover is downwardly and forwardly inclined and includes an appropriately formed, generally horizontally disposed frame fixed relative thereto about the lower periphery thereof.

4. The accordion cover as defined in claim 1 wherein said frame members are generally arched in configuration.

5. The accordion cover as defined in claim 1 wherein the respective ends of said slot are chamfered.

* * * * *